United States Patent [19]
Peck

[11] 3,848,963
[45] Nov. 19, 1974

[54] MICROSCOPE STAGE FINGERS
[75] Inventor: Theodore H. Peck, Irondequoit, N.Y.
[73] Assignee: Bausch & Lomb Incorporated, Rochester, N.Y.
[22] Filed: Feb. 14, 1973
[21] Appl. No.: 332,454

Related U.S. Application Data
[63] Continuation-in-part of Ser. No. 154,335, June 18, 1971, abandoned.

[52] U.S. Cl. ................................................. 350/90
[51] Int. Cl. ............................................ G02b 21/26
[58] Field of Search ......................... 350/86, 87, 90

[56] References Cited
UNITED STATES PATENTS
1,891,052  12/1932  Ott .................................... 350/90 X
2,148,908  2/1939  Lory .................................... 350/90

Primary Examiner—David H. Rubin
Attorney, Agent, or Firm—Frank C. Parker; Harry C. Post

[57] ABSTRACT

Fingers having free terminal ends employed to hold a prepared microscope slide on a microscope scanning stage are pivotally mounted on a cross slide member and biased to exert a downward pressure on the prepared slide no matter what movement is made by the cross slide member thereby keeping the slide in snug contact with the upper surface of the stage so that the prepared slide stays in focus during scanning under high powered objectives.

4 Claims, 1 Drawing Figure

PATENTED NOV 19 1974
3,848,963
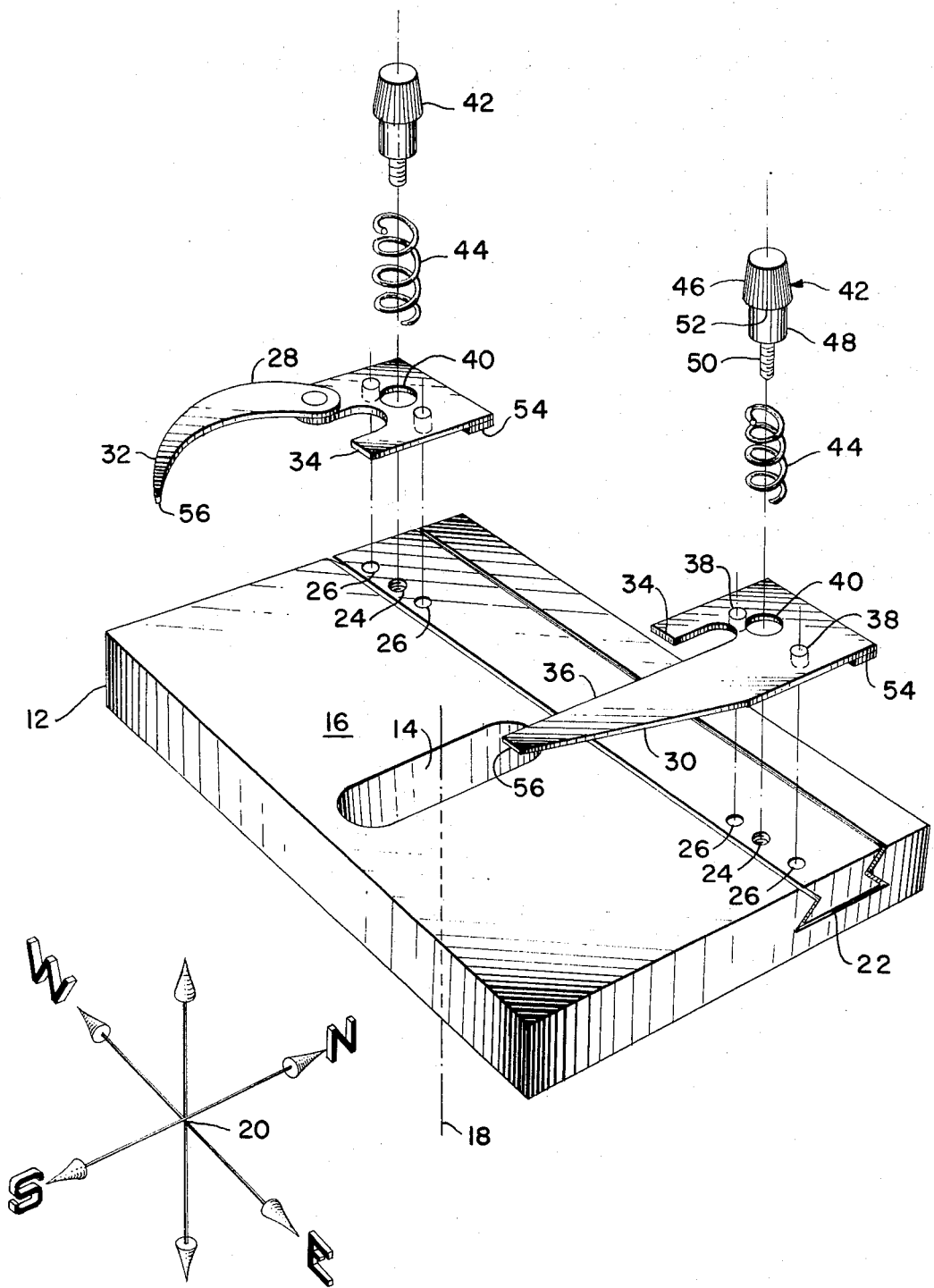

MICROSCOPE STAGE FINGERS

CROSS REFERENCE TO RELATED APPLICATIONS

This is a Continuation-In-Part of my application Ser. No. 154,335, filed June 18, 1971, now abandoned.

BACKGROUND OF THE INVENTION

1. Field of the Invention

The field of the invention is microscope stages, and more particularly the invention relates to improved means for mounting slide-carrying fingers in scanning stages.

2. Description of the Prior Art

Microscope stage fingers are used to hold a prepared microscope slide on a scanning stage. They are attached by screws to a cross slide which is movable orthogonally to the main stage whose mounting is movable, usually toward and away from an observer.

A difficulty with existing stages and fingers is that torques are induced by a cross slide member which impart motions to the fingers often to so great a degree as to cause them to raise a prepared slide out of the thin focal zone, or focal envelope, provided by a high powered microscope objective. This phenomenon is very annoying to the microscopist since he must then refocus the microscope and reorient himself to the new position. The known stage fingers and their mountings do not appear to deal satisfactorily with this problem since all of them appear to have one kind or another of torque-inducing mounting.

SUMMARY OF THE INVENTION

The way or channel in which the cross slide member moves has elements with it including ball bearings or rods which assist in the movement. During production the fit between the way, the cross slide member and the movable elements, such as ball bearings, are not accurate to specifications causing the cross slide member to move in varying and random directions from that which is exactly parallel with the planar surface of the microscope stage. The random movements of the cross slide member produce torques causing the fingers to be moved in varying directions thereby moving a microscopic slide held by the fingers out of a pre-determined focal plane.

To avoid these distortion-inducing torques in the stage fingers, the inventor provides a new mounting apparatus. Instead of the conventional screw, the finger is attached by a knurled, shouldered screw used with a downward-acting spring and each finger is equipped with a small underpad to act as a fulcrum.

The inventor through the use of the individual spring members, the fulcrum means, and the method of attaching the fingers to the cross slide member in effect floats the free terminal ends of the fingers independently of any random movement of the cross slide member.

The springs lightly push the fingers down onto the main stage, urging the terminal ends of the fingers and the prepared slide snugly in contact therewith. Since the main stage is slightly dished although substantially perpendicular to the optical axis of the microscope, the prepared slide will "average" the dished contour while in sliding contact with the stage. This approach to mounting the fingers on a scanning stage eliminates the problem of the prepared slide rising out of the focal envelope during scanning.

DETAILED DESCRIPTION OF THE PREFERRED EMBODIMENT

In the drawing, which is a diagrammatic exploded view of a microscope stage according to the invention, the stage member 12 is shown defining an elongated aperture 14. The upper surface 16 of the stage 12 is substantially planar, and the plane of the surface 16 is perpendicular to a microscope optical axis 18. The stage 12, in addition to being vertically focusable, is slidably mounted in horizontal ways, not shown, for movement in what has come to be known in microscopist's parlance, as the "North-South" direction, as may be seen in the three-axis compass rose 20, toward and away from the microscopist. Since a substage light source directs light rays along the axis 18, it may be appreciated that the aperture 14 is configured with its longitudinal axis parallel with this North-South direction to avoid interruption of these rays during North-South scanning of the stage 12.

Meanwhile, a cross slide member 22 is mounted in ways or channels associated with the stage 12 for sliding in a substantially East-West direction. The cross slide 22 defines two sets of bores therein each comprising a relatively large, threaded bore 24 flanked by smaller smooth-walled bores 26. Stage fingers 28 and 30 respectively are provided, the finger 28 comprising a spring action on a curved end 32 of the finger 28 as is well known in the art, to urge a prepared microscope slide horizontally against stops 34 and the portion 36 of the finger 30 so as to hold the slide immobilized to the cross slide 22 and rectilinear with the North-South and East-West directions during scanning movements. Such scanning movements are induced by manipulation of knobs driving rack and pinion mechanisms, not shown, for transmission of the desired motions to the stage 12 and cross slide 22 as is well known in the art, such mechanisms forming no part of the present invention.

The fingers 28 and 30 are both rigid as respects vertical flexures, although as noted above, the finger 28 is articulated to exert a horizontal bias on a prepared slide.

The fingers 28 and 30 may be connected at their back ends by a single cross bar rather than being completely separate as shown in the figure.

The fingers 28 and 30 are each equipped with a pair of pins 38 protruding from their undersides, the pins 38 being adapted to fit freely into the aforementioned small bores 26 in the cross slide 22, it being their function readily to locate the fingers' positions on the slide 22 and thereafter loosely to constrain them against rotational motion about the vertical axis.

Defined in each of the fingers, between the pins 38 are bores 40, the centerlines of which conform substantially to those of the bores 24 in the cross slide 22.

Screws 42, adapted to fit with coil springs 44, and formed with a knurled portion 46, a smooth shank 48 and a threaded portion 50 cooperative with the aforementioned threads in the bore 24, are used to retain the fingers 28 and 30 in position on the slide 22.

The shanks 48 fit inside the bores 40 and their diameters are chosen to provide a loose fit, the fingers thereby having limited freedom to pivot in a vertical plane about an East-West axis, once the threaded portions 50 of the screws 42 are tightened against the threads in the bores 24.

The springs 44 are of an inside diameter sufficient to freely receive the shanks 48, but too small to pass into the hole 40 or over the shoulder 52 formed by the knurled portion 46 and the shank 48. Their length at rest is calculated to exceed slightly the dimension between the shoulder 52 and the top of the stage finger associated therewith, in order, when assembled, to cause the spring to be slightly compressed and thereby to exert a slight downward pressure on the finger.

To allow for slight irregularities in the stage surface 16, or for bits of dirt and debris which may accumulate under the fingers on the stage, it is desirable to elevate the fingers 28 and 30 slightly at points behind the bores 40 relative to the stage 12, by means of the small thin pads 54, thereby providing a fulcrum around which a finger may be pivoted downward. The inventor has found that neoprene is a suitable material for such pads and that they may be conveniently cemented in position on the underside of the fingers.

Those skilled in the microscope art will now perceive that a prepared microscope slide held by the tips 56 of the fingers will not only be thereby constrained to follow movements of the cross slide 22 in both North-South and East-West directions, but that such a prepared slide will additionally be snugly urged by the tips 56 against the planar surface 16 of the stage 12, thereby adopting the stage's perpendicular orientation with respect to the optical axis 18 as well as the stage's flatness and regularity as respects the narrow focal envelope.

Furthermore, such a prepared slide so urged against the stage surface averages out the irregularity in the surface 16, thereby further contributing to the consistency with which it will remain in the focal envelope of a high power microscope objective during East-West scanning. The inventor has found, for example, that even with a stage exhibiting an elevation difference so great that it would normally be regarded as defective, a prepared slide held by the inventor's stage fingers was able to average the irregularities of the stage sufficiently to hold the slide within the focal envelope of a high powered microscope objective.

Those skilled in the art will further perceive that the use of the invention effectively serves to relax various machining tolerances in stages, cross slides and fingers, which would otherwise be needed to minimize the distortions above referred to.

I claim:

1. In combination with a microscope stage having a substantially planar surface, a cross slide member movable in relation to the planar surface, and first and second spaced fingers with each finger having a free terminal end and an upper and lower surface, each finger being connected to the cross slide member in superposed relation to the planar surface, and one finger having a spring action to urge a microscope slide against the other finger to hold the microscope slide immobilized relative to the cross slide member, the improvement comprising:

fulcrum means attached to the lower surface of each finger; and a spring member engaged to the upper surface of each finger between the terminal end and a plane of the fulcrum means transversing the upper surface, the spring member urging the terminal end of the fingers toward the surface of the stage thereby floating the terminal ends of the fingers independently of any random movement of the cross slide member.

2. The invention of claim 1, wherein the terminal ends of each finger abut the planar surface and the fulcrum means is a rectangular pad.

3. The invention of claim 1, wherein the spring member urges each finger independently of the other finger toward the planar surface of the stage.

4. Apparatus for supporting a microscope slide on a microscope stage having a substantially planar surface without imparting distortion inducing torques to the microscope slide, comprising:

a cross slide member being movable in relation to the planar surface and having two sets of bores spaced apart and formed therein, each set of bores comprising a pair of spaced small bores and a larger internally threaded bore formed between the smaller bores;

first and second fingers in superposed relation to the planar surface with one finger having a spring action to urge a microscope slide against the other finger and each finger having a free terminal end and an upper and lower surface, fulcrum means attached to the lower surface of each finger, a pair of spaced pins for fitting into the small bores of the cross slide member projecting from the lower surface of each finger on a transverse plane between the fulcrum means and the terminal end, and an aperture formed through each finger between the pins;

a headed screw having a shank passed through the aperture of each finger and threadingly engaged with the larger internally threaded bore of the cross slide member; and a spring member engaged to the upper surface of each finger and the headed screw for independently urging the terminal end of each finger toward the surface of the stage.

* * * * *